US011580977B2

United States Patent
Yang et al.

(10) Patent No.: US 11,580,977 B2
(45) Date of Patent: Feb. 14, 2023

(54) CONFIGURABLE CONVERSATION ENGINE FOR EXECUTING CUSTOMIZABLE CHATBOTS

(71) Applicant: salesforce.com, inc., San Francisco, CA (US)

(72) Inventors: Xinyi Yang, San Mateo, CA (US); Tian Xie, Los Altos, CA (US); Caiming Xiong, Menlo Park, CA (US); Wenhao Liu, Redwood City, CA (US); Huan Wang, Fremont, CA (US); Kazuma Hashimoto, Menlo Park, CA (US); Yingbo Zhou, Palo Alto, CA (US); Xugang Ye, Bellevue, WA (US); Jin Qu, Sunnyvale, CA (US); Feihong Wu, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 199 days.

(21) Appl. No.: 17/037,556

(22) Filed: Sep. 29, 2020

(65) Prior Publication Data
US 2022/0101844 A1    Mar. 31, 2022

(51) Int. Cl.
*G10L 15/22*    (2006.01)
*G10L 15/16*    (2006.01)
(Continued)

(52) U.S. Cl.
CPC .............. *G10L 15/22* (2013.01); *G10L 15/16* (2013.01); *G10L 15/26* (2013.01); *G10L 15/30* (2013.01); *G10L 2015/223* (2013.01)

(58) Field of Classification Search
CPC .......... G10L 15/22; G10L 15/26; G10L 15/30
See application file for complete search history.

(56) References Cited

U.S. PATENT DOCUMENTS

| 2017/0200106 A1* | 7/2017 | Jones ...................... G06Q 10/08 |
| 2018/0025726 A1* | 1/2018 | Gatti de Bayser ..... G10L 15/22 704/257 |

(Continued)

FOREIGN PATENT DOCUMENTS

EP    3531416 A1    8/2019

OTHER PUBLICATIONS

Amazon, "Setting up AWS Chatbot," Date Unknown, two pages, [Online] [Retrieved on Dec. 8, 2020] Retrieved from the Internet <URL: https://docs.aws.amazon.com/chatbot/latest/adminguide/setting-up.html>.

(Continued)

*Primary Examiner* — Ibrahim Siddo
(74) *Attorney, Agent, or Firm* — Fenwick & West LLP

(57) ABSTRACT

A conversation engine performs conversations with users using chatbots customized for performing a set of tasks that can be performed using an online system. The conversation engine loads a chatbot configuration that specifies the behavior of a chatbot including the tasks that can be performed by the chatbot, the types of entities relevant to each task, and so on. The conversation may be voice based and use natural language. The conversation engine may load different chatbot configurations to implement different chatbots. The conversation engine receives a conversation engine configuration that specifies the behavior of the conversation engine across chatbots. The system may be a multi-tenant system that allows customization of the chatbots for each tenant.

20 Claims, 12 Drawing Sheets

(51) Int. Cl.
    *G10L 15/26*     (2006.01)
    *G10L 15/30*     (2013.01)

(56) References Cited

U.S. PATENT DOCUMENTS

| | | | |
|---|---|---|---|
| 2018/0090137 A1* | 3/2018 | Horling | G10L 15/22 |
| 2018/0096686 A1 | 4/2018 | Borsutsky et al. | |
| 2020/0125901 A1* | 4/2020 | Pelov | G06K 9/6262 |

OTHER PUBLICATIONS

Google, "Google Apps Script bot," Dec. 7, 2020, four pages, [Online] [Retrieved on Dec. 8, 2020] Retrieved from the Internet <URL: https://developers.google.com/hangouts/chat/quickstart/apps-script-bot>.

Parr, B., "Introducing Octane AI, The Easiest Way to Create a Bot," Nov. 2, 2016, eight pages, [Online] [Retrieved on Dec. 8, 2020] Retrieved from the Internet <URL: https://medium.com/@benparr/introducing-octane-ai-the-easiest-way-to-create-a-bot-1b5b9615405>.

Schlicht, M., "The Complete Beginner's Guide To Chatbots," Apr. 20, 2016, 22 pages, [Online] [Retrieved on Dec. 8, 2020] Retrieved from the Internet <URL: https://chatbotsmagazine.com/the-complete-beginner-s-guide-to-chatbots-8280b7b906ca?gi=9ff4477a51cc>.

PCT International Search Report and Written Opinion, PCT Application No. PCT/US2021/013778, dated Jun. 23, 2021, 12 pages.

\* cited by examiner

CONFIGURABLE CONVERSATION ENGINE FOR EXECUTING CUSTOMIZABLE CHATBOTS

BACKGROUND

Field of Art

This disclosure relates in general to chatbot conversations in online systems, and in particular to a customizable conversation engine for executing chatbots.

Description of the Related Art

Online systems often use chatbots for interacting with users. A chatbot provides an automated conversational interface for users of an online system. Chatbots allow users to interact with the online system in a natural way, for example, using voice and natural language. Chatbots are also referred to as conversational assistants, artificial intelligence (AI) assistants, intelligent virtual assistants, or virtual agents.

Artificial intelligence based chatbots receive user utterances that may be provided as voice signals and use automated speech recognition techniques to recognize the sentences in user utterances. A chatbot may analyze user utterances using artificial intelligence techniques including machine learning based models, for example, artificial neural networks. Conventional chatbots are typically based on hardcoded scripts that specify the actions that the chatbot needs to perform in response to specific user utterances. Accordingly, making modifications to the chatbots is cumbersome and error prone.

Figure 1:
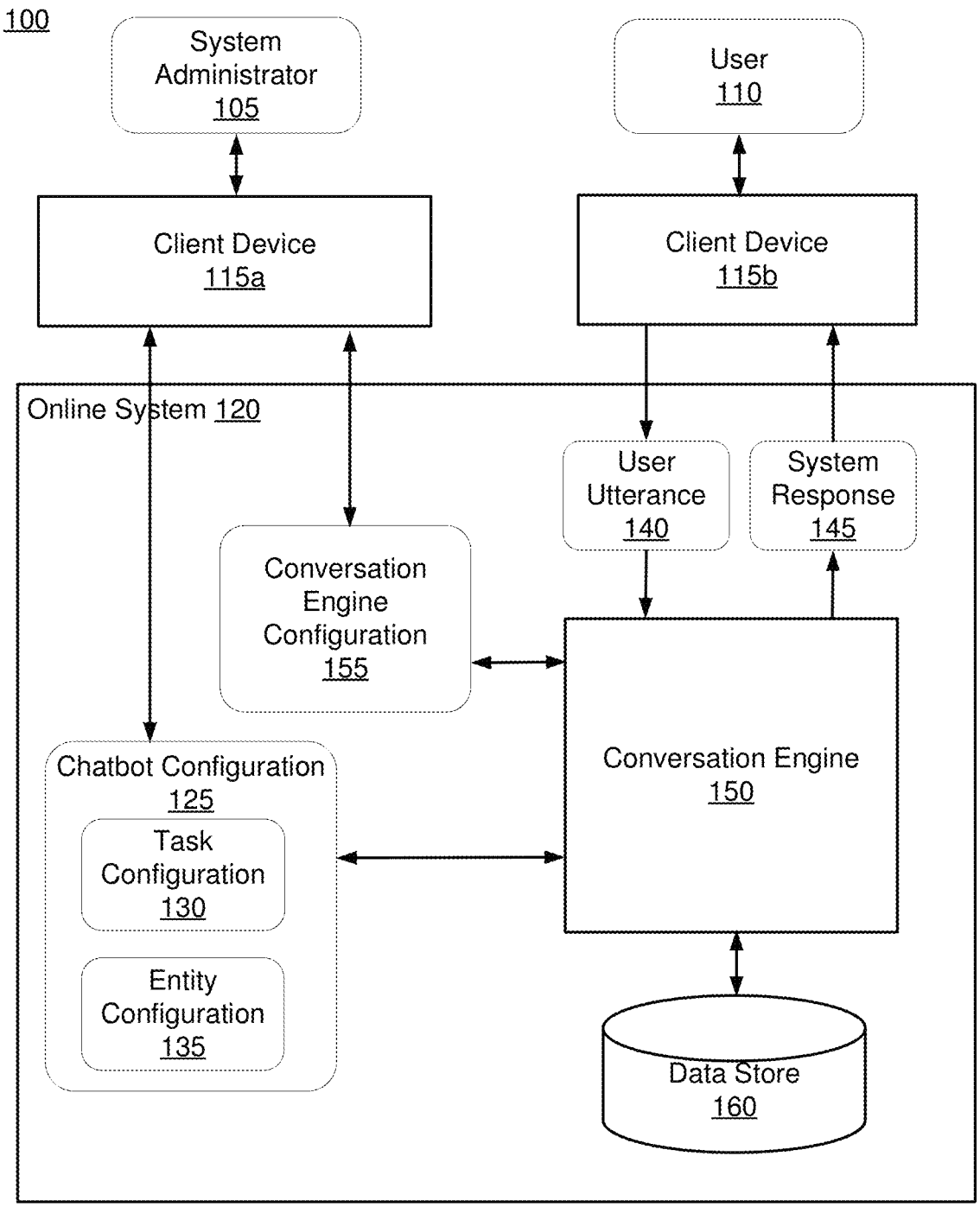
FIG. 1 is a block diagram of a system environment for performing chatbot conversations, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system allows users to perform tasks using customized chatbots. A chatbot may be customized to allow users to perform a specific set of tasks using the online system. The chatbot allows users to perform tasks based on conversations, for example, natural language conversations. The chatbot receives utterances of users and determines the task that the user is requesting. The online system executes a conversation engine that represents a runtime execution engine that can read the configuration of any chatbot and execute instructions to implement that chatbot. The behavior of the conversation engine across chatbots is customizable using a conversation engine configuration. The conversation engine configuration specifies a set of states in which a chatbot can exist and actions performed by conversation engine in each state for executing the chatbot.

The conversation engine receives the conversation engine configuration that is applicable across chatbots and a chatbot configuration that is specific to a chatbot. The conversation engine implements the chatbot according to the chatbot configuration as well as the conversation engine configuration. The conversation engine initializes the state of the chatbot. The conversation engine performs each task by repeating the following steps. The conversation engine receives a user utterance and determines attributes of the user utterance. For example, the conversation engine may determine whether the user utterance includes information, a polarity of the user utterance, and so on.

The conversation engine performs actions based on the state of the chatbot and attributes of the user utterance. The actions perform one or more of the following: (1) identify the task requested by the user, (2) collect information needed for performing the task, for example, values of entities relevant to the task, or (3) update the state of the chatbot. The actions may be performed over multiple iterations. For example, if the task requires values of multiple entities, the conversation engine may perform multiple iterations to determine the values. In each iteration, the conversation engine generates a response and sends the response to the user. The user utterance received subsequently starts a new iteration. The above steps are repeated as the conversation proceeds.

System Environment

FIG. 1 is a block diagram of a system environment 100 for performing chatbot conversations according to an embodiment. The system environment 100 includes an online system 120 that communicates with users via client devices 115. The online system 120 includes a conversation engine 150 and a data store 160. The online system 120 may include other components not shown in FIG. 1, for example, other types of data stores, external system interfaces, and so on. The system environment 100 may include other elements not shown in FIG. 1, for example, a network. The online system 120 may be referred to herein as a system.

Users 105, 110 of the online system 120 interact with the online system using client devices 115. Some users may be privileged users, for example, system administrators 105 that maintain and configure chatbots and the conversation engine. Other users 110 simply use the functionality provided by the online system, for example to perform various tasks supported by the online system using chatbots.

The conversation engine 150 uses chatbots to perform conversations with users 110. The online system 110 allows system administrators 105 to customize the chatbots using a chatbot configuration 125. The online system 110 further allows users to customize the execution of the configuration engine using a conversation engine configuration 155. As shown in FIG. 1, a system administrator 105 may use a client device 115a to provide the chatbot configuration 125 and the conversation engine configuration 155 to the online system 120.

The conversation engine 150 may implement (or execute) a chatbot that is customized to perform a set of tasks, for example, tasks performed by the online system. A user interacts with a chatbot by interacting with a conversation engine 150 that implements the chatbot. The conversation engine 150 may execute multiple chatbots by maintaining separate states and data structures for each chatbot. For example, the conversation engine may execute multiple virtual machines, each virtual machine executing a chatbot. Each chatbot executed by the conversation engine 150 is configured to perform a set of tasks. Different chatbots can execute different sets of tasks. Furthermore, different chatbots may execute different set of instructions for performing the same task since they may be configured differently. For example, one chatbot may execute a particular set of instructions to perform a check-order task and another chatbot may execute a different set of instructions to perform check-order task.

The conversation engine configuration 155 specifies behavior of the conversation engine that is applicable across all tasks of a chatbot. Furthermore, the conversation engine configuration 155 specifies the behavior of the conversation engine 150 that is applicable across multiple chatbots that may be executed by the conversation engine 150. The conversation engine configuration 155 may specify how the conversation engine processes user utterances. For example, the conversation engine configuration 155 may specify the actions taken by the conversation engine 150 when the user provides an utterance that has no information, such as "ok". The conversation engine configuration 155 may specify the number of times a user is allowed to provide user utterances with no information before the conversation engine 150 sends a response stating goodbye to the user and closing the conversation with the user.

The chatbot configuration 125 is received from a user such as a system administrator 105 and processed by the conversation engine 150. The chatbot configuration 125 allows users to configure and customize chatbots used by the conversation engine 150. A chatbot may be customized to allow users to perform a specific set of tasks. An enterprise that performs certain types of transactions may customize the chatbot to allow users to have conversations with the online system 120 to perform tasks related to the transactions, for example, perform authentication, execute a transaction, check status of a transaction, cancel a transaction, and so on.

In an embodiment, the chatbot configuration 125 includes a task configuration 130 and an entity configuration 135. The task configuration 130 specifies the tasks that can be performed by users using the chatbot. The entity configuration 135 specifies information describing entities that represent values that are needed for performing the tasks. For example, to check status of an order, the online system 120 needs the order id or one or more values to identify the order, such as the date the order was placed, the account used to place the order, and so on. The entity configuration 135 specifies methods for determining values of an entity. For example, an entity may be determined by accessing a database, another entity may be determined by communicating with a web service, another entity may be determined by asking the user, another entity may be determined by running a system command.

Figure 4:
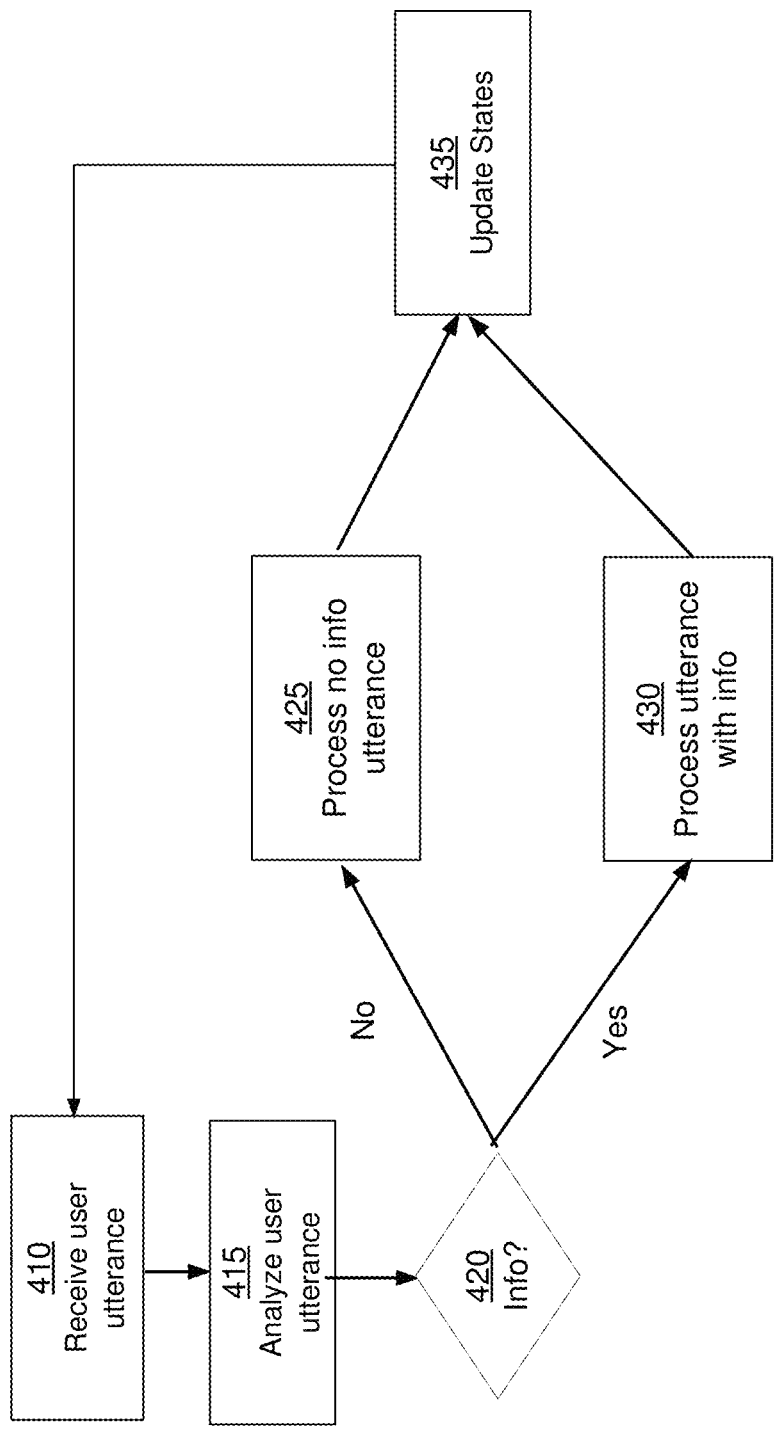
FIG. 4 illustrates a flow chart of the conversation engine logic based on an example conversation engine configuration, according to an embodiment.

FIG. 4 provides an illustrative example of task configurations 130 and entity configuration 135. For each task, the task configuration 130 specifies a set of entities that are relevant for performing the task. The values represented by entities may be provided by the user or may be determined by the conversation engine 150, for example, by accessing the data store 160 or by invoking certain services, for example, web services. For example, if the task represents retrieving the status of an order, the entities relevant to the task include the order ID and the status of the order itself. The conversation engine 150 may obtain the order ID from the user, for example, by generating a question to request the order ID or requesting information such as date of the order that can be used to access the order ID. The conversation engine 150 may access the order status from the data store 160 and provide the order status information to the user.

The conversation engine 150 performs conversations with users 110 according to the configuration 125. The conversation engine 150 receives user utterances 140 and performs tasks based on the user utterances. The conversation engine 150 may interact with the data store 160 to perform the task, for example, to access information stored in the data store 160 or to update information stored in the data store 160. The conversation engine 150 may generate a system response 145 and provide to the user. The system response 145 may be sent to the user to request additional information required to perform the task. The system response 145 may inform the user that the task is completed or provide the user with requested information.

In some embodiments, the online system 120 is a multi-tenant system that allows multiple tenants to use the system, each tenant representing a group of users. The term tenant refers to an organization or enterprise that is a customer of the multi-tenant system. The term tenant can refer to the set of users of the entire organization that is the customer of the multi-tenant system or to a subset of users of the organization. Accordingly, embodiments allow tenant-specific chatbots that may be customized for a set of users, for example, the entire set of users of the organization, a specific group of users within the organization, or an individual user within the organization. The multi-tenant system stores data of multiple tenants and allows tenants to share applications running on the multi-tenant system. The multi-tenant system may run various applications that tenants are allowed to execute.

The data store 160 stores data for users of the online system 120. A multi-tenant system may store data for multiple tenants in the same physical data store, for example, data store 160 but enforce a logical separation of data across tenants. As a result, one tenant does not have access to another tenant's data, unless such data is expressly shared. The data store 160 may be implemented as a relational database storing one or more tables.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
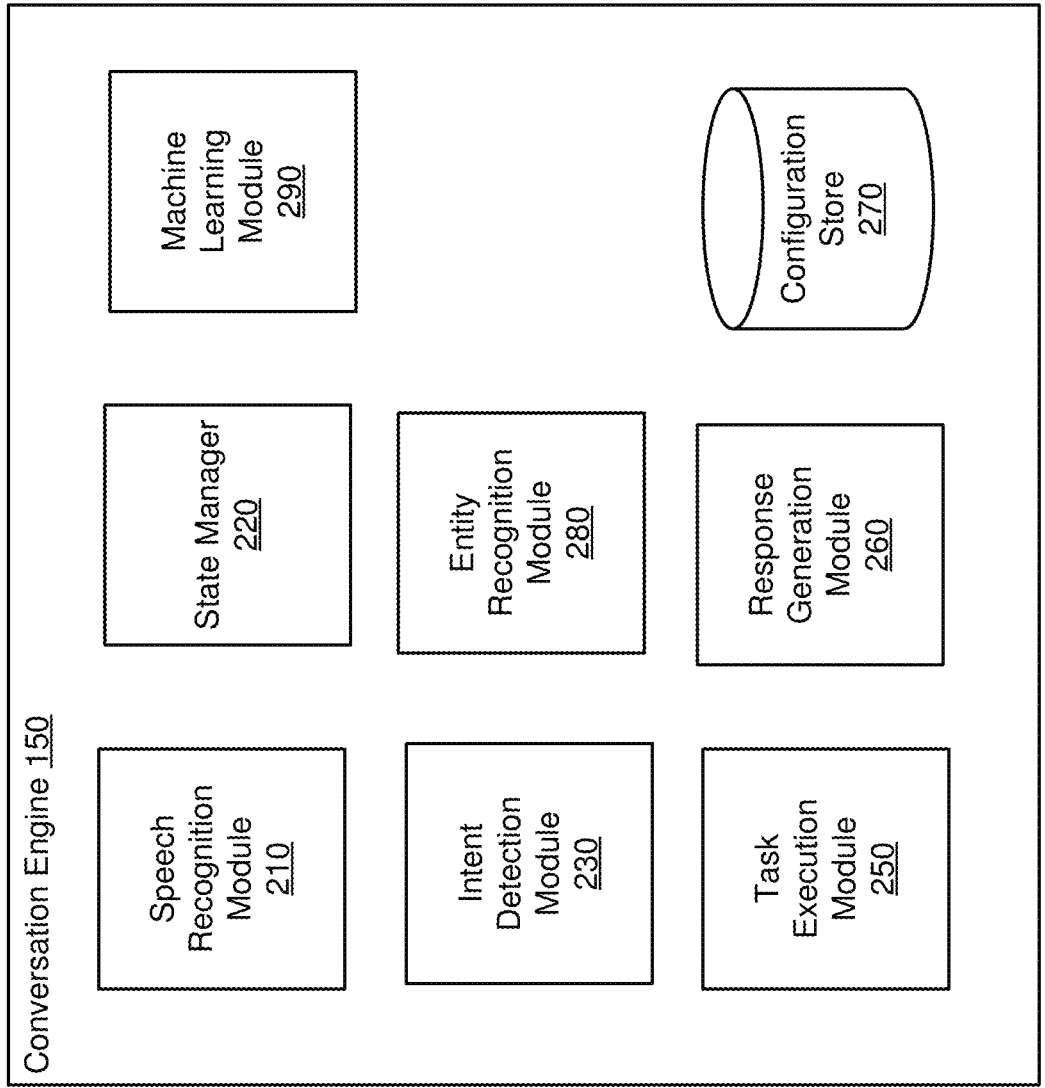
FIG. 2 is a block diagram of a system architecture of a conversation engine, according to an embodiment.

FIG. 2 is a block diagram of a system architecture of a conversation engine, according to an embodiment. The online system 120 comprises a speech recognition module 210, a state manager 220, intent detection module 230, a task execution module 250, a response generation module 260, a configuration store 270, an entity recognition module 280, and a machine learning module 290. Other embodiments can have different and/or other components than the ones described here. Furthermore, the functionalities described herein can be distributed among the components in a different manner.

The configuration store 270 stores chatbot configurations and conversation engine configurations. A chatbot configuration or conversation engine configuration may be stored as a configuration file, for example, an XML or a YML file. The configuration store 270 may be a file system or a database, for example, relational database.

The conversation engine 150 allows users to perform tasks using the online system 120. For example, if the online system implements an e-commerce website, the conversation engine 150 allows users to perform tasks related to transactions such as executing an online transaction, checking status of a transaction, canceling an ongoing transaction, and so on.

The conversation engine 150 performs natural language conversations with users. The conversation engine 150 receives utterances from users. The utterances may be received as text signals via a user interface that allows users to input text or as voice signals via a user interface that allows users to speak into a microphone that captures the voice signal. If the user is using a voice-based interface for the conversation, the conversation engine 150 uses the speech recognition module 210 to convert the audio signal received to text for further processing.

The conversation engine 150 may ask questions to users for receiving information. The conversation engine 150 generates dialogs that are presented to the user. The conversation engine 150 receives natural language answers from users. The conversation engine tracks state of a conversation to make sure that various questions are answered. The conversation engine 150 provides the answers received from users to various other modules.

The state manager 220 maintains state of a chatbot. If the conversation engine 150 implements a single chatbot the state of the chatbot may be considered the state of the conversation engine. The state is used for performing a conversation with a user via a chatbot. If the conversation engine 150 is confirming a specific type of information, the conversation engine uses the state to represent the type of information being confirmed. Subsequently, if the conversation engine receives a user utterance indicating a confirmation, the conversation engine uses the state to determine the type of information being confirmed. For example, if the conversation engine 150 is confirming whether to continue, the conversation engine 150 sets the state variable confirm_continue to true. Accordingly, if the subsequent user utterance indicates that the user said yes, representing a positive polarity, the conversation engine determines the next actions to perform based on the state variable confirm_continue and the polarity attribute of the user utterance.

In an embodiment, the state manager 220 stores a data structure storing a set of state variables, each state variable tracking an attribute of the conversation. An attribute may represent the type of task being currently processed in the conversation. The state manager 220 may store an array of state variables as representation of the state of a chatbot. Following is an example array of state variables representing the state of a chatbot. The state manager 220 initializes the state variables and then updates them as a conversation proceeds. In an embodiment, the state manager 220 maintains a lookup table, for example, a dictionary structure that maps various state variables to values of the state variables and allows the conversation engine to lookup the value of any state variable using a name of the state variable.

```
states['cur_task'] = None
states['cur_entity_type'] = None
states['confirm_continue'] = False
states['need_confirm_entity'] = False
states['task_stack'] = [ ]
states[num_turns'] = 0
states['prev_task'] = None
states['entity_method'] = [ ]
```

In the above list, the state variable cur_task stores the type of task being currently performed, the state variable cur_entity_type stores the type of entity for which a value is being determined, the state variable confirm_continue indicates whether the chatbot is confirming with the user if the user wants to continue the conversation, the state variable task_stack stores a stack data structure that stores all the tasks being executed currently, the state variable num_turns stores a number of iterations performed with the user towards achieving a goal (for example, to determine value of an entity), the state variable prev_task represents the previous task that was being performed, the state variable entity_method represents the method for determining value of an entity being processed currently, and so on.

The task execution module 250 performs the tasks requested by a user via a chatbot conversation. The task execution module 250 may interact with other components, for example, with the data store 160 to access data or update data necessary for executing a task. The task execution module 250 may interact with external services, for example, a mapping service to confirm an address.

In an embodiment, the task execution module 250 maintains a task data structure that stores a set of tasks. For example, the task data structure may be a stack data structure or a queue data structure. The task data structure may be accessible as a state variable. If the task execution module 250 executes a task, the task execution module 250 stores a task object on the task data structure. The task object specifies a type of task and includes slots for storing various entities required for executing the task. The task execution module 250 obtains a task from the task data structure and processes it.

The task configuration may specify that performing a task requires execution of other related tasks. For example, to perform a task representing execution of a transaction, the system performs a sub-task representing authentication of the user before executing another sub-task representing the transaction. Accordingly, for executing a task, the task execution module 250 may add other tasks to the task data structure. When the task execution module 250 finishes a task, it checks the task data structure to determine if there are any unfinished tasks. If the task execution module 250 determines that there are unfinished tasks in the task data structure, the task execution module 250 retrieves an unfinished task and executes it. The task execution module 250 continues processing unfinished tasks stored on the task data structure until all tasks are executed.

In an embodiment, the task execution module 250 maintains a tree data structure representing the tasks. The tree data structure is illustrated in FIGS. 10A-D. The tree data structure includes a root node. The task execution module 250 adds any tasks requested by the user as sub-nodes of the root node. If a task requires sub-tasks, the sub-tasks are also added to the tree data structure, for example, a sub-task may be added as another task under the root node or nested within the parent task that created the sub-task.

The task execution module 250 allows users to perform a context switch by requesting a new task while a previous task is not completed. If a user performs a context switch, the task execution module 250 adds the new task to the task data structure. The task execution module 250 tracks the order in which the tasks are being processed, for example, using a last-in-first-out stack data structure. The task execution module 250 completes a task and then checks the task structure to pick another task that is unfinished. Once a task is completed, the task is removed from the stack data structure.

The speech recognition module 210 receives audio signal as input and converts the audio signal into text for further processing. The speech recognition module 210 allows a user to use voice for conducting conversations with the online system 120. The output of the speech recognition module 210 is provided as input to other modules of the online system 120. In an embodiment, the speech recognition module 210 provides a confidence level for a word that is recognized indicating a likelihood that the word was transcribed correctly.

The intent detection module 230 determines the user intent based on the user utterances. An intent represents a task that the user wants to perform but may represent any other type of information. The intent detection module 230 stores a set of intents 202 that represent the various possible actions that a user could intend by a given natural language expression. For instance, some example intents might express the user's desire to change the user's email address, to change the user's physical mailing address, to begin composition of an electronic message, or the like. The intents can be represented in any manner (e.g., as an integer or string), as long as each intent's representation is distinct from the others.

The intent detection module 230 additionally stores, for each intent, a set of example natural language expressions. The examples for an intent are representative expressions in natural language form that are known to indicate that intent on the part of a user who uses those expressions. The examples may be stored in any suitable form, such as text. In some embodiments the intent detection module 230 stores approximately 5 examples for each intent, an amount of examples that is easily feasible for a data scientist or other knowledgeable user to provide directly. For instance, the examples for the intent expressing the desire to change the user's email address might be {"I want to update my email address", "I need to change my email address", "Update email address", "Please change my email address", "Update my email"}. In embodiments in which the online system 120 stores the data of multiple tenants, each tenant may have its own set of intents and examples that are specific to it, thus allowing natural language understanding that is tailored for the domain in which the tenant is operating.

According to an embodiment, the neural network is configured to receive as input a natural language sentence and an example phrase and determine whether the example phrase can be inferred from the natural language sentence. An example phrase can be inferred from a natural language sentence if the natural language sentence implies the example phrase. The example phrase may be another natural language sentence or a portion of a natural language sentence.

In an embodiment, the neural network generates a confidence score indicating a measure of confidence that the example phrase can be inferred from the natural language request. For example, a higher measure of confidence indicates a higher likelihood that the example phrase can be inferred from the natural language request. Given two example phrases, the scores generated by the neural network for a natural language sentence can be compared to determine which example phrase reflects the intent of the natural language request better. Furthermore, given a set of example phrases, the neural network can be executed using pairs of the natural language sentence and example phrases from the set as input to generate scores. The scores can be compared to determine the beast matching example phrase that represents the intent of the natural language sentence. The neural network may be trained using labelled training data set storing pairs of natural language sentences and example phrases that can be inferred from them.

In an embodiment, the intent detection module 230 determines which of the various possible intents, if any, is most applicable for a given natural language expression of a user. To do so, the intent detection module 230 uses a neural network that determines, for a given first natural language expression and a given second natural language expression, a score indicating a likelihood that the first natural language expression textually entails the second natural language expression. (A first natural language expression is said to textually entail a second natural language expression—or, equivalently, the second natural language expression is said to be inferable from the first natural language expression—if a human reading the first expression would consider that the second expression to is most likely true. For example, the expression "I would like to change my email address" textually entails the expression "Change user information", because a human would likely conclude that the second expression is indeed being requested in light of the first expression.)

The machine learning module 290 trains the neural network using labeled data set comprising several pairs of natural language requests and corresponding example phrases. The example phrases corresponding to an intent may be specified in a task configuration 130 provided by a system administrator. The input to the training is a set of ordered natural language expression pairs, along with a label for each pair indicting whether the first expression of the pair does or does not textually entail the second expression of the pair. Such pairs and corresponding labels may be obtained from corpuses such as SNLI, MNLI, or WNLI, with the appropriate preprocessing (e.g., converting corpus labels indicating entailment to a binary "true" value and labels indicating contradiction, or neither entailment nor contraction, to binary "false" values). Techniques such as BERT (Bidirectional Encoder Representations from Transformers) may be used to train the neural network given the input pairs and labels.

In some such embodiments, the machine learning module 290 also trains other types of models. For example, the intent detection module 230 may use the machine learning module 290 to train an intent classification model that directly predicts the user's intent for a given natural language expression. Specifically, the intents determined to apply to a given natural language expression as described above are treated as "soft" labels for the expression. The set of all such expressions with intent labels produced then serves as input to the machine learning module 290, which uses a supervised learning algorithm to generate an intent classification model that directly predicts user intent.

The entity recognition module 280 identifies an entity that is related to a permitted action that is requested by a user. An entity refers to a value that the system determines to execute a task. For example, to execute a task for verifying a user, the system may determine one or more of, a name of the user, a zip code of the user, an email of the user, and so on. To retrieve a record of a transaction, the system may need information to uniquely identify the record, for example, a date and time stamp associated with the transaction, a record identifier, and so on. The task configurations specify the types of entities that are required to perform a task.

The entity recognition module 280 may execute different methods for recognizing an entity of an entity type, as specified in the entity configuration. For example, in the example configuration C provided herein, for a zip code entity type, four methods are specified including (1) named entity recognition, (2) spelling, (3) regular expression, and (4) fuzzy matching.

The entity recognition module 280 performs named entity recognition by providing the sentence to a named entity recognition model that receives a sentence as input and identifies one or more named entities and their types. Named entities are entities that are associated with a set of predefined categories, for example, person names, organizations, locations, time expressions, quantities, monetary values, percentages, and so on. In an embodiment, the named entity recognition model is a neural network that is trained using sentences with known named entities. As an example, for an example, input sentence "I want a television to be delivered to San Jose by end of the week" the named entity recognition model recognizes the following categories of named entities and their values: category product, value "television"; category time, value "end of week"; and category location, value "San Jose."

The entity recognition module 280 executes the spelling method for entity recognition by providing the spelling to the user of the entity and asking the user to confirm or by asking the user to spell out the entity. The entity recognition module 280 executes the regular expression method for entity recognition by matching various portions of the input sentence against regular expressions specified in the entity configuration and selecting a portion of the sentence that matches the regular expression. The entity recognition module 280 executes the fuzzy matching method for entity recognition by performing a fuzzy match of portions of the input sentence against sample expressions specified in the entity configuration. If a portion of the sentence is determined to have a high degree of match with an example based on a fuzzy match, the entity recognition module 280 determines that the portion of sentence is of the entity type for which the method was specified in the entity configuration.

Conversation Engine Configuration

Figure 3:
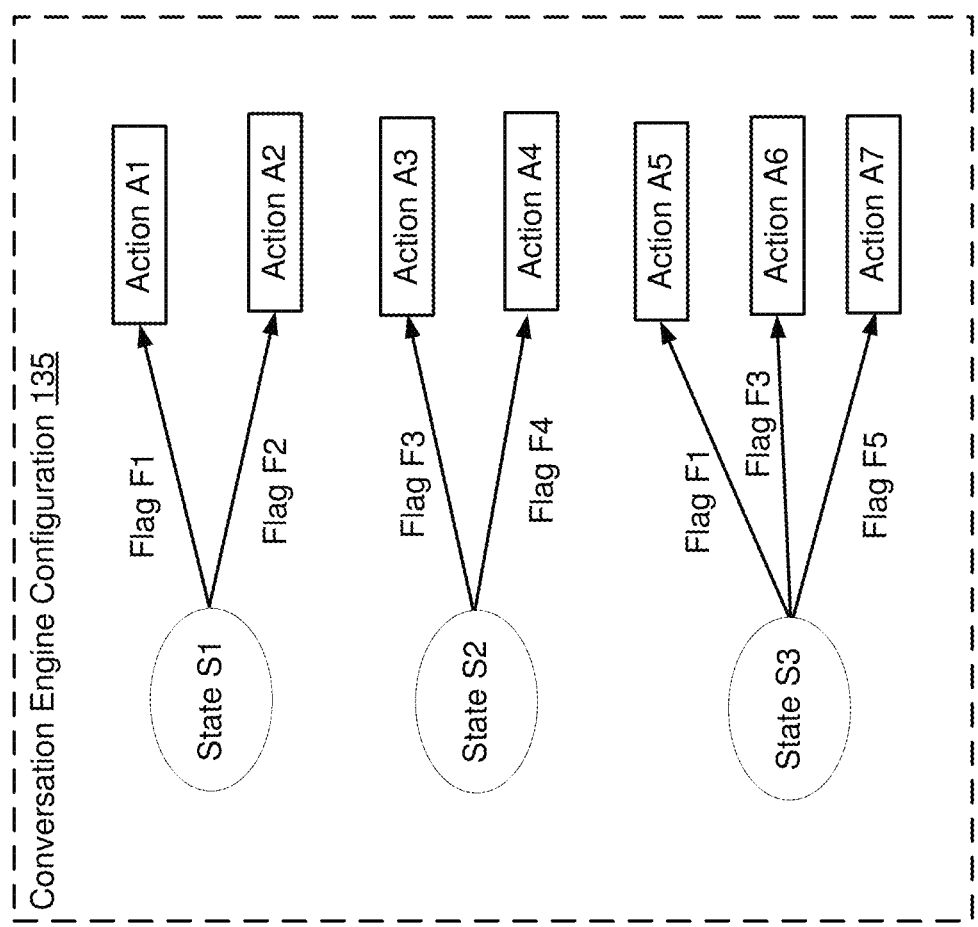
FIG. 3 shows an example of conversation engine configuration used for customizing a conversation engine, according to an embodiment.

FIG. 3 shows an example of conversation engine configuration used for customizing a conversation engine, according to an embodiment. As shown in FIG. 3, the conversation engine configuration identifies several states and actions that can be performed when the chatbot is in each state. The following examples may refer to a chatbot and a conversation engine interchangeably, although a conversation engine may execute different chatbots at different times or concurrently.

A conversation performed by a chatbot may include a sequence of interactions between the user and the chatbot. Typically, a conversation starts with a user providing an initial utterance. The chatbot may perform some action in response to the user utterance and provide a response. The user may provide another utterance based on the response. This interaction may repeat multiple times. For example, the chatbot may analyze the user utterance to determine that the user is requesting a particular task that requires one or more entities, each entity representing a value used for performing the requested task. The chatbot may interact with the user to request values of the entities. Accordingly, the chatbot may send one or more responses to the user, each response requesting a value of a particular entity. The chatbot may perform the task once all the entities relevant to the task are determined. The chatbot may send a response indicating that the task is complete. The chatbot may further ask the user if the user wanted to perform another task. Accordingly, this set of interactions between the chatbot and the user may repeat for the new task.

In an embodiment, the chatbot allows user to context switch between tasks, for example, by requesting a task T2 while the chatbot is interacting with the user to perform task T1. Accordingly, the chatbot can perform multiple tasks requested by the user concurrently. In an embodiment, a task may include other subtasks that need to be performed in order to complete the task. Accordingly, the chatbot may perform multiple tasks at the same time since they are part of a larger task.

In an embodiment, the conversation engine configuration specifies flags that represent attributes of a user utterance. A polarity flag may represent a polarity of the user utterance, wherein the polarity is one of: positive, negative, or neutral. A got_info flag may represent whether the user utterance includes information expected by the conversation engine based on a previous response provided by the conversation engine to the user. If the user utterance does not include the expected information, the conversation engine sets a got_info flag to false or else the conversation engine sets a got_info flag to true.

In a given state, the chatbot performs different actions depending on the values of the flags. For example, as shown in FIG. 3, if the conversation engine 150 is in state S1 and receives a user utterance with flag F1, the conversation engine 150 performs action A1; if the conversation engine 150 is in state S1 and receives a user utterance with flag F2, the conversation engine 150 performs action A2; the conversation engine 150 is in state S2 and receives a user utterance with flag F3, the conversation engine 150 performs action A3; the conversation engine 150 is in state S2 and receives a user utterance with flag F4, the conversation engine 150 performs action A4, and so on.

Following is an example of a conversation engine configuration 155 (configuration A). The references in parenthesis after each line are shown for identifying the line and are not part of the instructions.

```
Flag:                                           ...(A1)
    - got_info                                  ...(A2)
    - polarity                                  ...(A3)
    - no_info_turn                              ...(A4)
    - got_intent                                ...(A5)
    - got_entity_info                           ...(A6)
State:                                          ...(A7)
    - cur_task                                  ...(A8)
    - confirm_continue                          ...(A9)
    - confirm_entity                            ...(A10)
    - confirm_intent                            ...(A11)
Logic:          ...(A12)
    - not got_info: # states and flags          ...(A13)
        - "not cur_task": # states and flags    ...(A14)
            - "polarity == 0":                  ...(A20)
                - "no_turns > threshold":       ...(A21)
                    - goodbye( )                ...(A22)
                - greetings( )                  ...(A23)
            - "polarity == 1 or polarity == −1": ...(A24)
                - repeat_response( )            ...(A25)
    - got_info:                                 ...(A26)
        - "confirm_intent":                     ...(A27)
            - task_confirm_handler( )           ...(A28)
        - "confirm_entity":                     ...(A29)
            - entity_confirm_handler( )         ...(A30)
        - "got_intent":                         ...(A31)
            - got_new_task( )                   ...(A32)
        - "got_entity_info":                    ...(A33)
            - entity_info_handler( )            ...(A34)
```

The conversation engine configuration 155 specifies a set of flags in lines A1-A6, states in lines A7-A11, and logic representing actions performed for a given combination of states and flags in lines A12-A34. Flag got_info in line A2 indicates whether the user utterance provided some information, for example, value of an entity or intent of the user utterance. An example of a user utterance that provides no information is the user simply saying "ok". If the user utterance provides information, the flag got_info is set to true or else it is set to false.

Another example of a flag is polarity (line A3) that represents whether the user utterance indicates a positive value or a negative value. For example, if the chatbot asks user for confirming whether a value is correct, and the user responds "yes" the polarity is 1 or true, whereas if the user responds "not" the polarity flag is 0 or false. Flag no_info_turn (like A4) represents a count of number of times the user provided a user utterance that did not provide information. The flag got_intent (line A5) indicates whether the user utterance provided a value of an intent that represents a task. The flag got_entity (line A6) indicates whether the user utterance provided a value of an entity.

A flag value is updated for each user utterance. For example, the polarity flag is determined based on the current utterance and the polarity value of the previous utterance is replaced with the value determined based on the current utterance. Similarly, got_info indicates whether the recent most utterance received provided information, and no_info_turn represents a count value based on the recent most user utterance.

The state variables represent values that are stored and applicable across user utterances. For example, the state variable cur_task represents whether there is any current task present, the state variable confirm_continue indicates whether the chatbot expects the user to confirm whether the user wants to continue based on the current conversation, the state variable confirm_entity indicates chatbot expects the user to confirm value of an entity based on the current conversation, the state variable confirm_intent indicates whether the chatbot expects the user to confirm value of intent based on the current conversation, and so on.

In an embodiment, the conversation engine configuration maps combinations of flag values and state values to handlers. A handler represents a set of instructions that perform one or more actions. Accordingly, the conversation engine performs the actions specified in a handler when the corresponding values of flags and states specified in the conversation engine configuration match the current state values and flag values.

Figure 5:
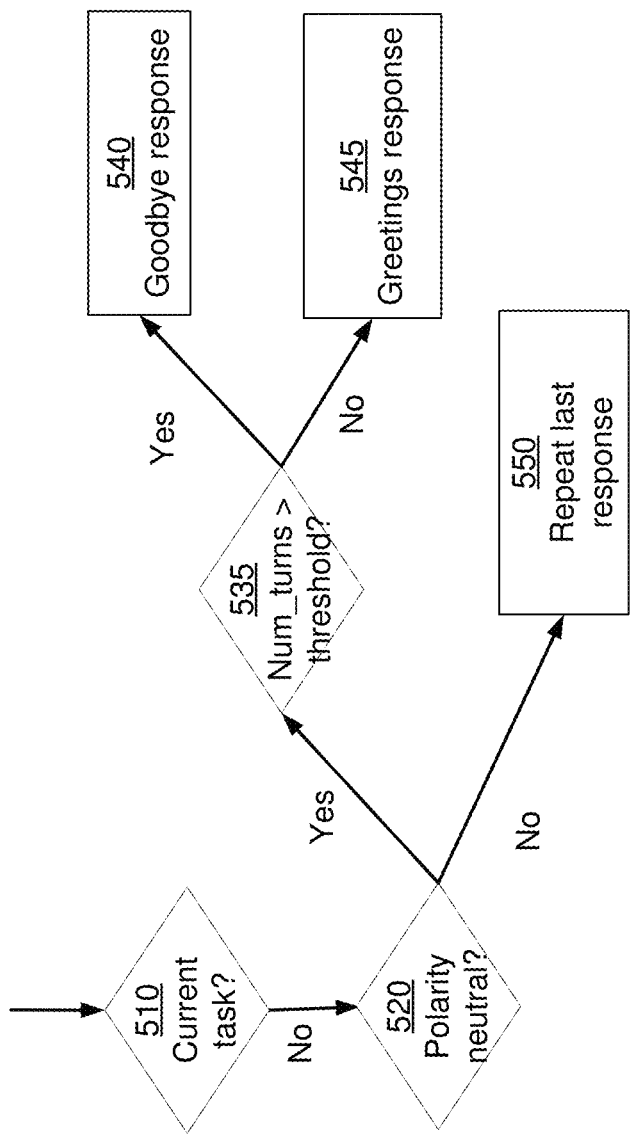
FIG. 5 illustrates a flow chart of the conversation engine logic for processing user utterance with no information, according to an embodiment.
Figure 6:
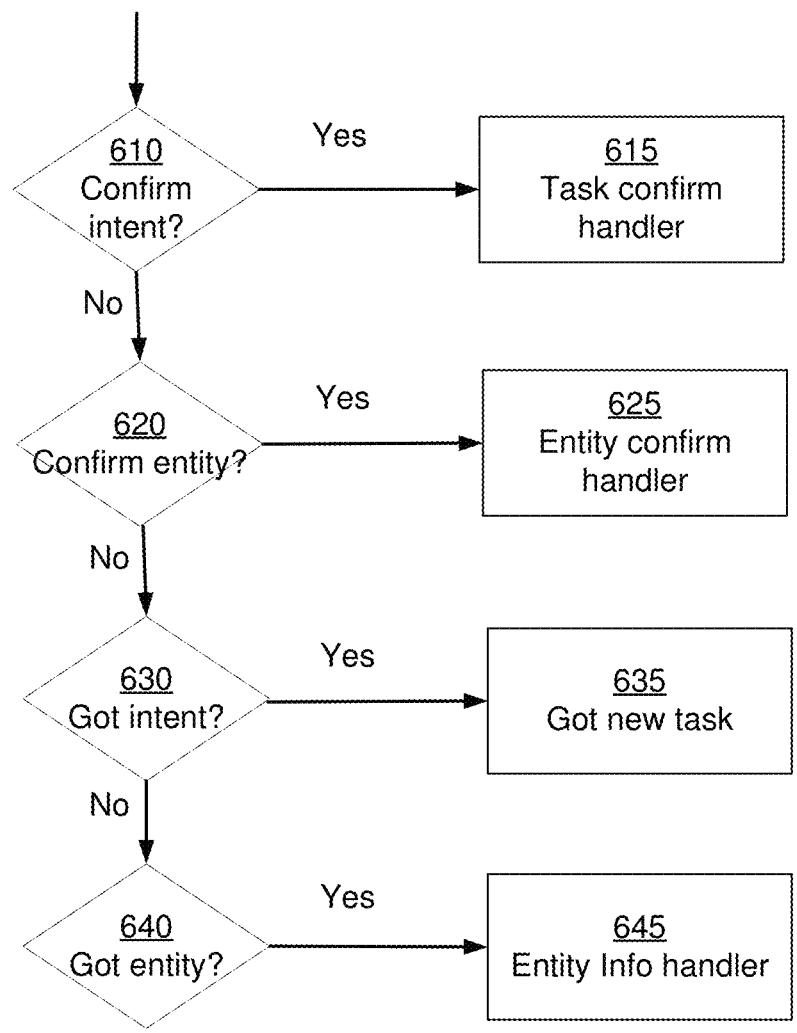
FIG. 6 illustrates a flow chart of the conversation engine logic for processing user utterance with information, according to an embodiment.

FIG. 4 illustrates a flow chart of the conversation engine logic based on an example conversation engine configuration, according to an embodiment. The example conversation engine configuration shown above is processed by the conversation engine to generate instructions for processing chatbots as shown in FIGS. 4-6. Not all lines of the configuration are illustrated in FIGS. 4-6.

The conversation engine 150 receives 410 a user utterance and analyzes 415 the user utterance. The analysis may include determining the intent of the user utterance, for example, using the intent detection module 230 that may use a neural network. The analysis may also determine whether the user utterance includes one or more entities relevant to a task corresponding to the intent of the user utterance.

The conversation engine 150 determines 420 whether the user utterance includes information as indicated by the flag got_info. The information may represent whether the intent is determined based on the user utterance or whether any entities were extracted based on the user utterance. The configuration corresponding to the flag "not got_info" represents instructions for processing user utterances that have got_info flag value as false indicating the user utterance does not include information and the configuration corresponding to the flag "got_info" represents instructions for processing user utterances that have got_info flag value true indicating the user utterance does include information, for example, intent information or entity information.

If the conversation engine 150 determines 420 that the user utterance does not include info, the conversation engine 150 performs processing 425 of utterance with no info, or else the conversation engine 150 performs processing 430 of utterance with info. In both situations, the conversation engine 150 updates 435 the states after the processing and repeats the above steps starting with receiving 410 the next user utterance.

FIG. 5 illustrates a flow chart of the conversation engine logic for processing 425 no-info utterance, according to an embodiment. The "not got_info" portion of the conversation engine configuration includes a check for flag "not cur_task" which represents checking 510 whether there are any unfinished tasks in the task structure. If there are no more tasks left for processing, the chatbot checks 520, whether the polarity of user utterance is neutral (like A20). The polarity of user utterance may be neutral if the user says something like "hello" which is neither positive utterance such as "yes", nor negative utterance such as "no." If the polarity of user utterance is neutral, the chatbot checks 535 (line A25) whether the number of turns indicated by counter num_turns exceeds a threshold value, indicating that the user said something that is neutral such as "hello" repeatedly more than a threshold number of times. If num_turns exceeds the threshold value, the chatbot provides 540 a goodbye response to the user (line A22) and stops the conversation or else the chatbot provides 545 a greetings response (line A23) to the user asking the user what the user wants to do. If the chatbot determines 520 that the polarity of the response is not neutral, for example, the user just said "yes" or "no", the chatbot repeats the last response that the chatbot generated for the user to remind the user of what the chatbot was requesting.

FIG. 6 illustrates a flow chart of the conversation engine logic for processing 430 utterance with info as indicated by lines A26-A34, according to an embodiment.

If the chatbot is expecting the user to confirm 610 intent (line A27), the chatbot executes the handler task_confirm_handler (line A28). If the chatbot is expecting the user to confirm 620 entity (line A29), the chatbot executes the handler entity_confirm_handler (line A30). If the chatbot determines based on the utterance that the chatbot determined 630 a new intent (line A31), the chatbot executes the handler got_new_task (line A32) that includes instructions for processing a new task. The got_new_task handler may cause the chatbot to build a task structure, for example, a task tree to process the new task. If there are subtasks that need to be performed to execute the new task, the chatbot may execute the sub-tasks. For example, a subtask may represent confirmation of the identity of the user. If the chatbot determines 640 that a new entity is received from the user (line A33), the chatbot executes the handler entity_info_handler (line A33) that includes instructions for processing a new entity that is received.

The conversation engine configuration can be modified by the user to include other instructions, for example, to handle the cases when the flag got_info is false and the chatbot needs to confirm intent with the user or confirm entity with the user.

Chatbot Configuration

The conversation engine configuration is applicable across chatbots and across tasks. The conversation engine also receives and loads a chatbot configuration that is specific to a chatbot. The chatbot configuration specifies the tasks that are specific to a chatbot and instructions for executing each task.

Figure 7:
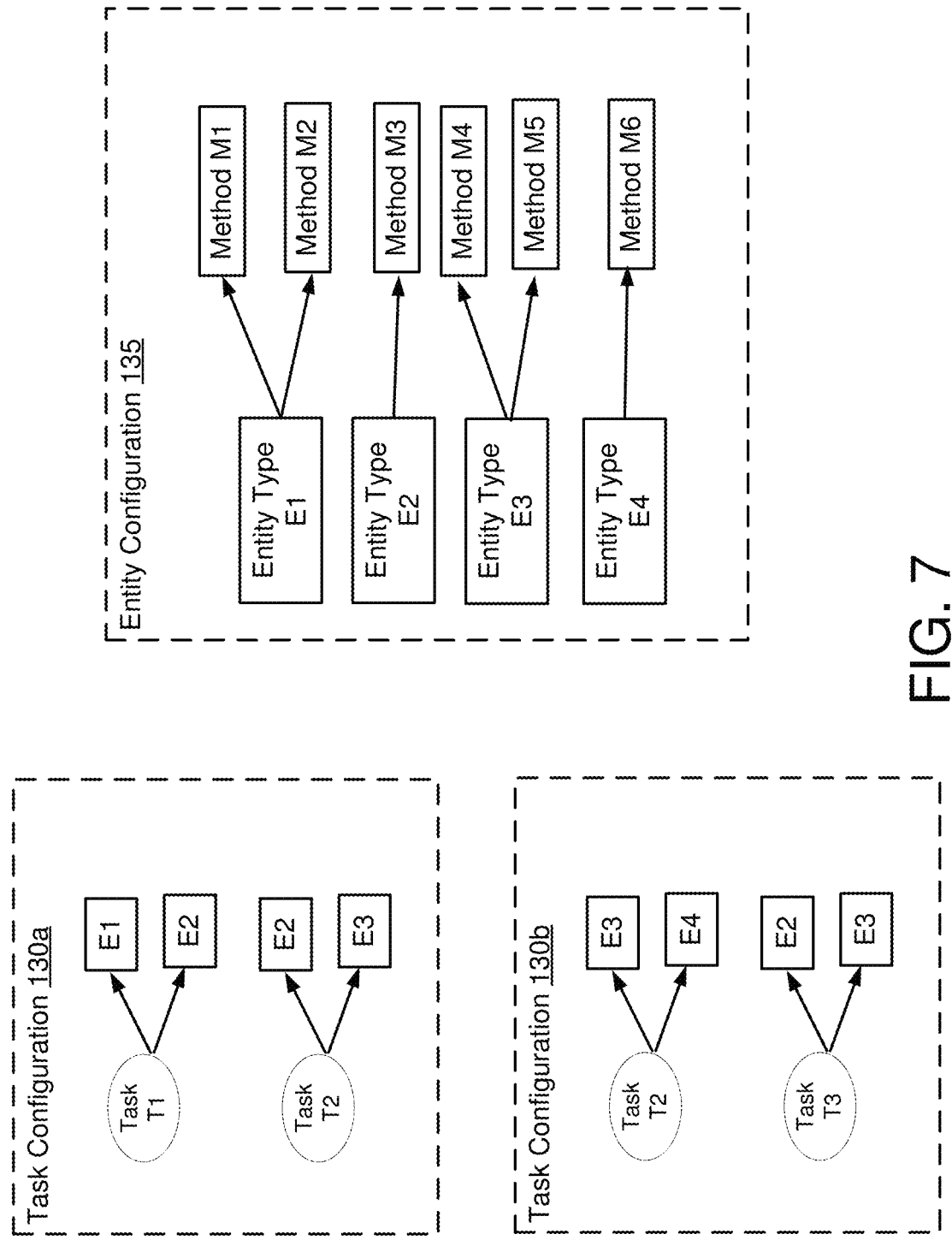
FIG. 7 shows examples of task configurations and entity configurations used for customizing chatbots, according to an embodiment.

FIG. 7 shows examples of task configurations and entity configurations used for customizing chatbots, according to an embodiment. In an embodiment, the online system 120 presents a user interface for a system administrator to provide information that may be stored in a configuration file storing the task configurations and entity configurations. As shown in FIG. 7, multiple task configurations 130 may be specified, each task configuration file for a specific chatbot customized for a set of tasks. For example, the task configuration 130a specifies configurations for tasks T1 and T2, whereas task configuration 130b specifies configurations for tasks T2 and T3.

Each task configuration specifies among other details, the entities relevant to performing the task. For example, as specified in task configuration 130a task T1 uses entities E1 and E2, whereas task T2 uses entities E2 and E3. The specification of a task in two different configuration files may be different. Accordingly, different entities may be specified as being associated with the same task in two different task configurations. For example, task configuration 130b specifies that task T2 uses entities E3 and E4 whereas configuration 130b specifies that task T2 uses entities E2 and E3.

The entity configuration 135 specifies methods for different entity types. For example, entity configuration 135 specifies entity types E1, E2, E3, and E4. Furthermore, entity configuration 135 specifies methods M1 and M2 for processing entity type E1, method M3 for processing entity type E2, methods M4 and M5 for processing entity type E3, and method M6 for processing entity type E4. In an embodiment, an entity configuration be specified independent of task configurations. Accordingly, the entity configuration will be used independent of the task configuration used by a chatbot. In other embodiment, an entity configuration may be specific to a task configuration. Accordingly, the entity configuration is used whenever a chatbot is using the corresponding task configuration. In an embodiment, the system may use a combination of task specific entity configurations and task independent configurations. For example, some entity types may be specified independent of task configurations and some entity types specified for specific task configurations.

In an embodiment, the same entity type may have one configuration in a task independent entity configuration and another configuration in a task specific entity configuration. The task specific entity configuration identifies a specific task for which the entity configuration is specified, for example, the task specific entity configuration may specify an entity configuration for entity type E1 for task T1. The task specific entity configuration is used if a chatbot is using that task, for example, task T1. The same entity type may be used for other tasks, for example, task T2 and T3. For chatbots using task configurations specify other tasks such as tasks T2 and T3, the entity specification from the task independent entity configuration is used.

Following is an example of a task configuration (configuration B) that specifies a task check_order. Although following example shows only one task, a task configuration may specify any number of tasks.

```
check_order:                                    ...(B1)
    description: check your order status              ...(B2)
    samples:                              ...(B3)
        - I have not received the ordered item yet     ...(B4)
        - The ordered item has not yet delivered       ...(B5)
        - is my ordered item on the way?        ...(B6)
        - i want to check order            ...(B7)
        - my order status                 ...(B8)
    entity_types:                         ...(B9)
        E1:                              ...(B10)
            - order_status                ...(B11)
        E2:                              ...(B12)
            - oid                        ...(B13)
    success:                             ...(B14)
        AND:                             ...(B15)
            - TASK:                      ...(B16)
                - verify_user             ...(B17)
            - INFO:                      ...(B18)
                - E1                     ...(B19)
            - QUERY:                     ...(B20)
                - E2                     ...(B21)
```

The configuration of the task includes a description (line B2), one or more samples (lines B3-B8), one or more entity types (lines B9-B13), and a success criterion (lines B14-B21). The samples specify examples of natural language sentences that may be used by a user requesting that particular task. The entity types identify entities that are relevant to that task. The success criterion may be a logical expression that specifies the processing that needs to be performed to successfully complete the task. The processing may specify certain entity actions that need to be performed to successfully complete the task. If the expression describing success of the task is an OR operation performed on entity actions associated with entities E1 and E2, the task is completed if either E1 or E2 is evaluated successfully by performing their corresponding entity actions. Accordingly, an OR expression evaluates successfully if any one of the sub-expressions of the OR expression evaluates successfully. An AND expression evaluates successfully if all sub-expressions of the AND expression evaluate successfully indicating the user verified that part of authentication successfully.

The online system supports a set of entity actions that can be specified in the task configuration. For example, the task configuration may specify an entity action INFO specifying that the online system provides the entity information. The entity action QUERY specifies that the online system will search entity based on information that the user provided. Similarly, the entity action INSERT specifies that the online system will insert a record based on information provided by user. The entity action DELETE specifies that the online system will delete a record identified based on information provided by user. The entity action UPDATE specifies that the online system will update a record identified based on information provided by the user. Similarly, the system may support other actions. A user may define an entity function, for example, using a function or method specified using a programming language.

Following is an example of an entity configuration file (configuration C).

```
verify_user:                                    ...(C1)
    email_address:                              ...(C2)
        type:                                   ...(C3)
            - EMAIL                             ...(C4)
        method:                                 ...(C5)
            - SPELLING                          ...(C6)
        confirm: yes                            ...(C7)
    zip_code:                                   ...(C8)
        type:                                   ...(C9)
            - CARDINAL                          ...(C10)
        methods:                                ...(C11)
            ner:                                ...(C12)
            spelling:                           ...(C13)
            regex:\d{5}                         ...(C14)
            fuzzy_matching:                     ...(C15)
                - 94301                         ...(C16)
                - 94305                         ...(C17)
        hints:                                  ...(C18)
            type:                               ...(C19)
                - INT                           ...(C20)
        other_parameters:                       ...(C21)
            - address                           ...(C22)
            - ner                               ...(C23)
        prompt:                                 ...(C24)
            - Could you please provide your zipcode?  ...(C25)
        confirm: yes                            ...(C26)
        function: funcGetWeather                ...(C27)
        response:                               ...(C28)
```

This is a task specific entity configuration that is used while performing a task, for example, verify_user task (line C1). The entity configuration specifies two entity types email_address (line C2-C7)) and zip_code (line C8-C17). For each entity type, the entity configuration specifies the value of the type of the entity (line C3-C4), C9-C10, one or more methods associated with the entity (lines C5-C6, C11-C17)), and a confirm flag (line C7, C27). The confirm flag specifies whether the system should confirm with the user if the value determined for the entity is correct. For example, the conversation engine may ask a question such as "Do you mean the email address is abc@email.com?" For entity type email_address, the type specified is "email", a single method "spelling" is specified, and the confirm flag has value "yes". For entity type zip_code, there are four methods specified, named entity recognition (ner, line C12), spelling (line C13), regular expression (regex, line C14), and fuzzy matching (line C15-C17). Details of these methods are further described herein.

In some embodiments, the task configuration specifies a user defined entity function. The user defined entity function may be specified using a language, for example, a programming language such as PYTHON. For example, the above example task configuration specifies a function funcGetWeather (line C27) that checks weather for the zip code corresponding to the entity zip_code. The function funcGetWeather may include instructions to interact with a web service that provides weather information. The function funcGetWeather can be invoked by the conversation engine during a conversation with a user to provide weather condition for a particular zip code.

In an embodiment, the entity configuration specifies a "response" attribute (line C28) that defines the response provided by the conversation engine to the user during a conversation. The response is provided by the conversation engine after the online system processes the entity that specifies the "response" attribute. In an embodiment, the "response" attribute specifies a template that includes a value associated with the entity. For example, the "response" attribute for the example "zip_code" entity show above may specify that the output of the funcGetWeather is appended to a string "The weather currently is" and provide to the user in response to the user question. Accordingly, the "response" attribute allows a user to customize a response associated with an entity. If the entity configuration does not specify a "response" attribute, the conversation engine may use a default response, for example, a statement such as the string "The value is" appended to the entity value. Similarly, the attribute "prompt" allows the user to customize the prompt that is presented to the user when the conversation engine requests a value from the user instead of using a default prompt.

The instructions for each method may be stored in a file and accessed for processing the entity. The system may perform certain checks associated with the type of the entity type to make sure that the value determined conforms to the type. For example, the type EMAIL may specify a specific format.

In some embodiments, the entity configuration specifies questions as templates that include combinations of text strings and values. For example, the entity configuration may specify a question ""What is"+entity_name". The conversation engine generates a question based on the template for asking to the user. The conversation engine 150 stores a set of default templates for generating questions for asking users. The conversation engine 150 checks the entity configuration to determine if the entity configuration specifies a template for a question for a particular context. If the entity configuration specifies a template for a question for that particular context, the conversation engine 150 uses the template from the entity configuration, or else the conversation engine 150 uses a default template.

An example of a context is the user providing a value for an entity type that is invalid. The conversation engine processes the received value to determine a type of error in the received value. The entity configuration specifies a template for a question for a specific type of error. If the error is format error caused by incorrect format of the entity value, the conversation engine uses a template that provides format information for the entity type in the question. For example, if the user utterance provided an order number that has invalid format, the conversation engine generates the following question and asks the user "The order number is a combination of 3 characters and 3 digit numbers, could you please provide a valid order number?" Accordingly, the entity configuration includes a set of questions for obtaining entity values during a chatbot conversation.

Execution of Conversation Engine

Figure 8:
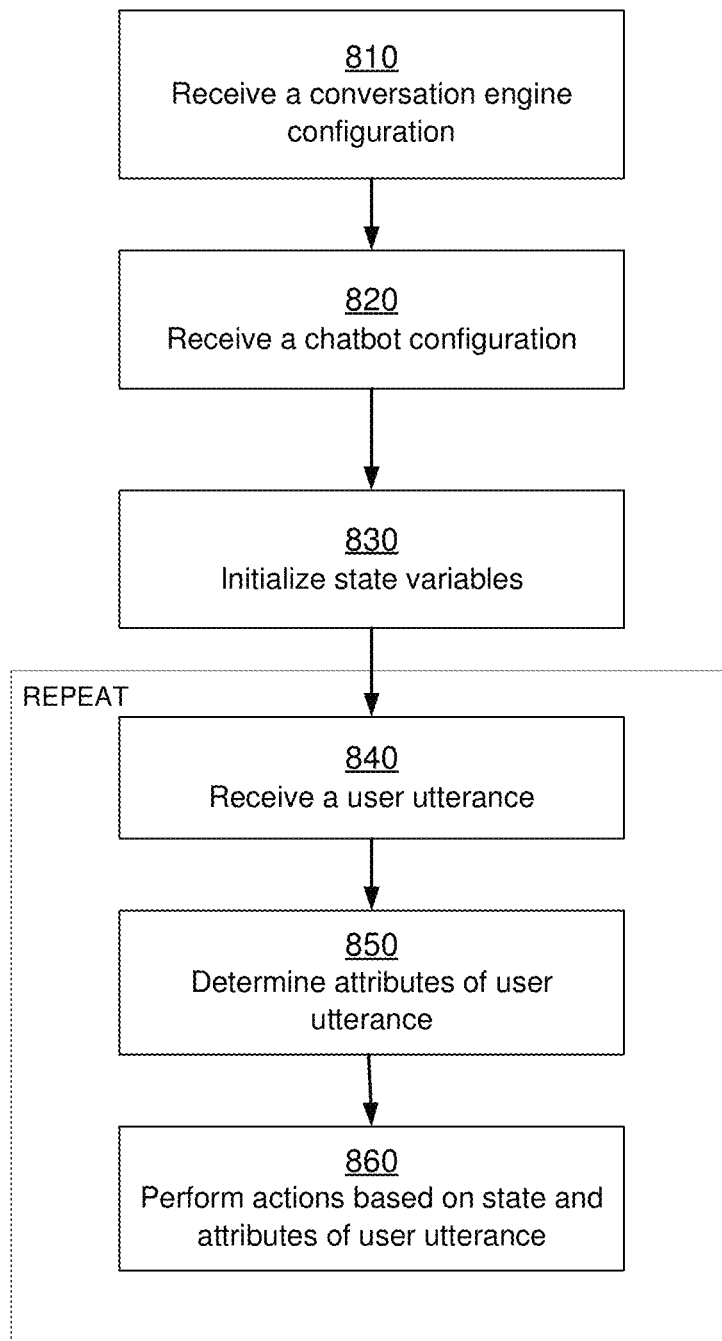
FIG. 8 is a flow chart illustrating the overall process of a conversation engine, according to an embodiment.
Figure 9:
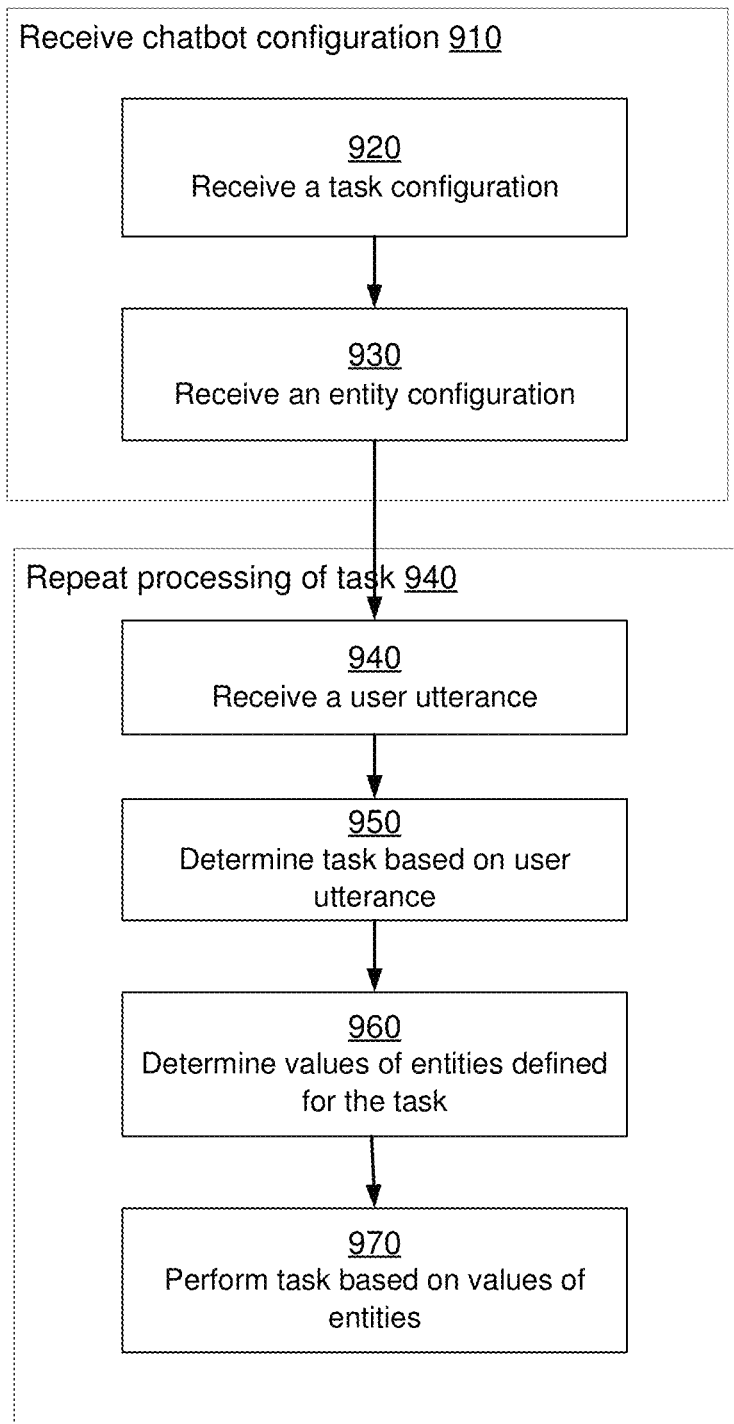
FIG. 9 is a flow chart illustrating the process for executing tasks for a chatbot, according to an embodiment.

Various processes related to determination of intent in utterances provided by users in a chatbot conversation are illustrated in FIGS. 8-9. Other embodiments can perform the steps of these flowcharts in different orders. Furthermore, various embodiments can include different and/or additional steps than the ones described herein.

FIG. 8 is a flow chart illustrating the overall process of processing user utterances, according to an embodiment. The conversation engine 150 receives 810 a conversation engine configuration specifying behavior of the conversation engine configured to execute a given chatbot. The conversation engine configuration specifies a set of states in which the given chatbot can exist and actions performed by conversation engine in each state for executing any chatbot. The conversation engine 150 receives a chatbot configuration specifying tasks supported by a chatbot. The conversation engine 150 initializes the state for the chatbot, for example, by resetting the values of all states and flags.

The conversation engine 150 executes the chatbot according to the chatbot configuration to perform tasks by repeating steps 840, 850, and 860. The conversation engine 150 receives a user utterance. The conversation engine 150 determines attributes of the user utterance that correspond to flags specified in the conversation engine configuration. The conversation engine 150 determines the actions to be performed based on the state of the chatbot and attributes of the user utterance. The actions cause the conversation engine 150 to various steps including: (1) identifying the task requested by the user, (2) collecting information needed for performing the task, for example entities processed by the task, or (3) updating the state of the chatbot, and so on. The actions may perform these steps over multiple iterations. For example, the conversation engine may determine the intent of the user in one iteration, a determine the value of an entity in each iteration. The conversation engine 150 performs the identified actions and repeats the above steps. The conversation engine 150 may update the state of the chatbot in each iteration. The conversation engine 150 may also generate a response and send to the user at the end of each iteration. After providing the response to the user, the conversation engine 150 receives the user utterance for the next iteration. If the conversation engine 150 determines that the conversation should end, the conversation engine 150 generates a goodbye response that says goodbye to the user and closes the session with the user.

FIG. 9 is a flow chart illustrating the process of executing tasks using customized chatbots, according to an embodiment. The conversation engine 150 receives 910 a chatbot configuration 125. The chatbot configuration 125 comprises a task configuration 130 and an entity configuration 135. Accordingly, the conversation engine 150 receives 920 the task configuration 130 and receives 930 the entity configuration 135.

The conversation engine 150 repeats the steps 940, 950, 960, and 970 to perform the processing of tasks requested by user based on conversations with the user. The conversation engine 150 receives 940 a user utterance. The conversation engine 150 determines 950 the task requested by the user based on the user utterance. In an embodiment, the conversation engine 150 compares the user utterance with example phrases associated with different types of tasks supported by the chatbot to identify the type of task requested by the user. For example, the conversation engine 150 may use a neural network to compare the user utterance with example phrases.

The conversation engine 150 determines the types of entities relevant to processing of the requested task based on the task configuration. The conversation engine 150 determines the values of the entities relevant to processing of the requested task. Each entity may be determined based on the methods corresponding to the entity type as defined in the entity configuration. For example, the conversation engine 150 may ask the user for the value of certain type if entity, the conversation engine 150 may access the value of the entity from a database, the conversation engine 150 may access a web service to determine value of the entity and so on. The conversation engine 150 performs the task based on the values of the entities that are determined.

Task Execution

Figure 10A:
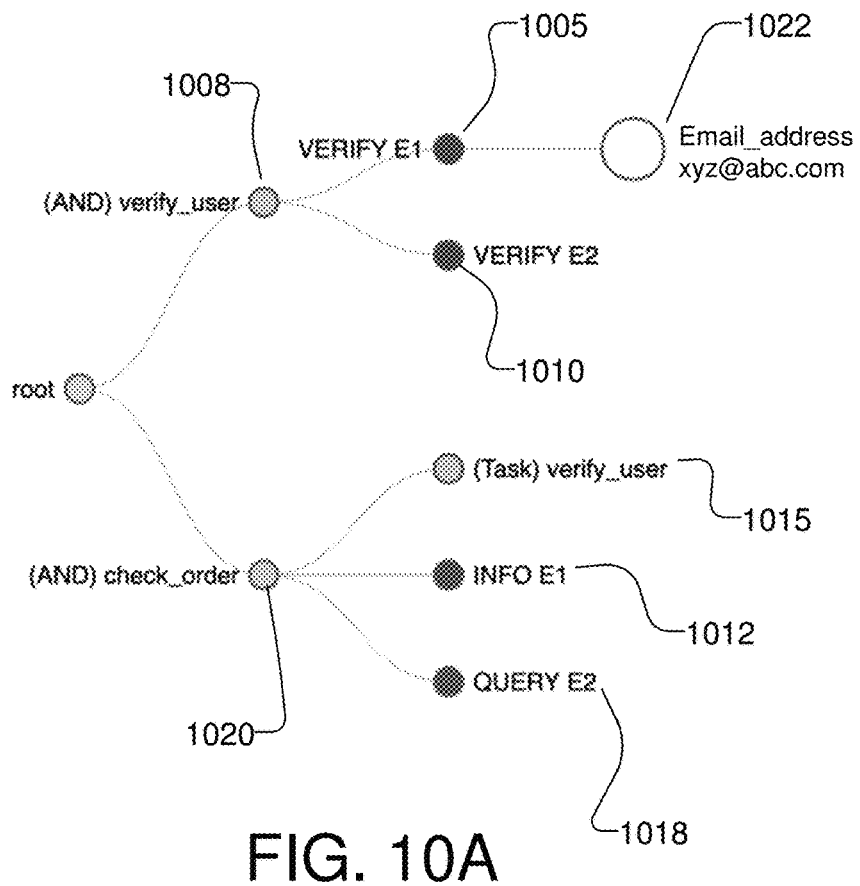
FIGS. 10A-D illustrate execution of tasks by the conversation engine, according to an embodiment.
Figure 10B:
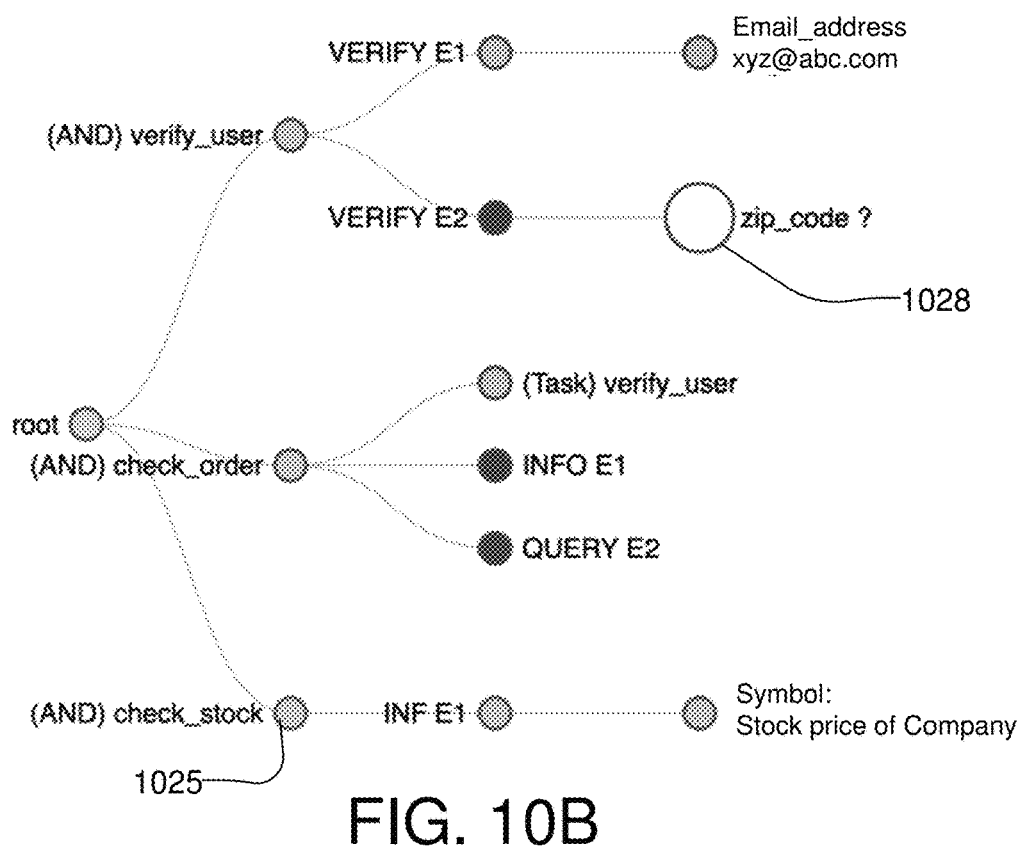
Figure 10C:
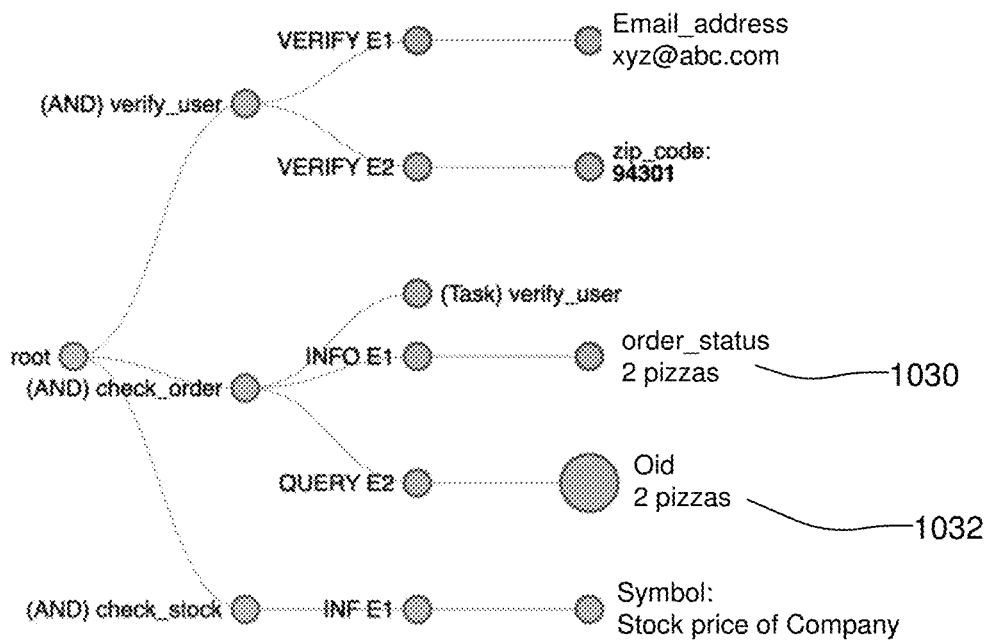

FIGS. 10A-D illustrates execution of tasks by the conversation engine, according to an embodiment. In response to a user providing a user utterance "I would like to check order", the conversation engine builds a task structure as shown in FIG. 10A. The conversation engine determines based on the analysis of the user utterance that it corresponds to check order_task (line B1). According to the example configuration B, successful completion of the task (line B14-B21) includes performing task verify_user (node 1015) and determining values of entity E1 and E2 (nodes 1012 and 1018 respectively). Accordingly, the conversation engine 150 adds a check_order task 1020 and verify_user 1008 to a root task. The verify user task includes verification of entities E1 (email_address) and E2 represented as nodes 1005 and 1010. The conversation engine generates a response requesting user to provide the email address. Once the user provides the email address the node 1022 is populated with the email address received from the user. The conversation engine continues processing the task according to the task tree.

The user may context switch while the system is performing the conversation related to check order. For example, the user may ask a question requesting the system to check the stock price of certain company. The conversation engine adds a new task check_stock (node 1025 in FIG. 10B) to the root node. The conversation engine tracks the two tasks. The conversation engine performs the task check_stock. When the task check_stock is complete, the conversation engine switches back to completing the task check_order. The conversation engine resumes the task check_order from the state in which the task check_order was left when the system performed the context switch to task check_stock. For example, after completing the check_stock task, the conversation engine may ask the user about the user's zip code to execute the node 1028.

If the user requests to check order again for another order, the conversation engine reuses the information available for the session. For example, the conversation engine does not need to perform the verify_user task again since the email address and zip code have already been requested from the user. Maintaining the task structure allows the conversation engine to determine whether the information was previously requested during this session or needed again. The conversation engine simply requests the user to provide the new order id (node 1032, FIG. 10C) and is able to execute the new task.

Figure 10D:
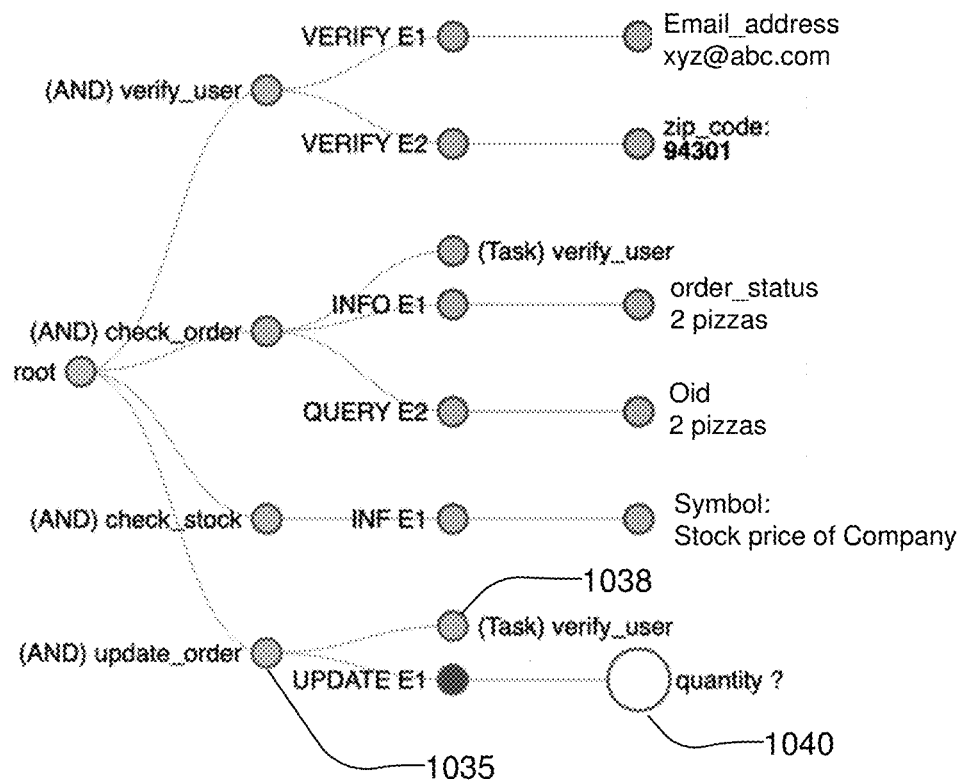

During the conversation, the conversation engine allows the user to request additional tasks, for example, the user may provide a user utterance "I want to order 3 more pizzas". The conversation engine determines that the user is requesting a new task update_order and adds a node 1035 (FIG. 10D). The conversation engine determines that the update order task also requires the conversation engine to verify user. However, in the current session, the conversation engine checks that the user has been verified based on the previous task and accordingly the new verify_user task (node 1038, FIG. 10D) is populated with the result previously obtained for node 1008. The new task update_order requires the conversation engine to determine the quantity (node 1040) for updating the order. The user utterance "I want to order 3 more pizzas" provides the user intent as well as an entity information, i.e., the quantity for node 1040.

In an embodiment, the conversation engine generates a visualization of the task structure for display via a user interface. The visualization corresponds to the screenshots illustrated in FIGS. 10A-D. The visualization may be used for testing and debugging of the conversation engine. In this embodiment, the conversation engine includes a user interface manager that analyzes the tree structure at each stage and generates an image representing the tree structure and renders the generated image via a user interface.

Computer Architecture

Figure 11:
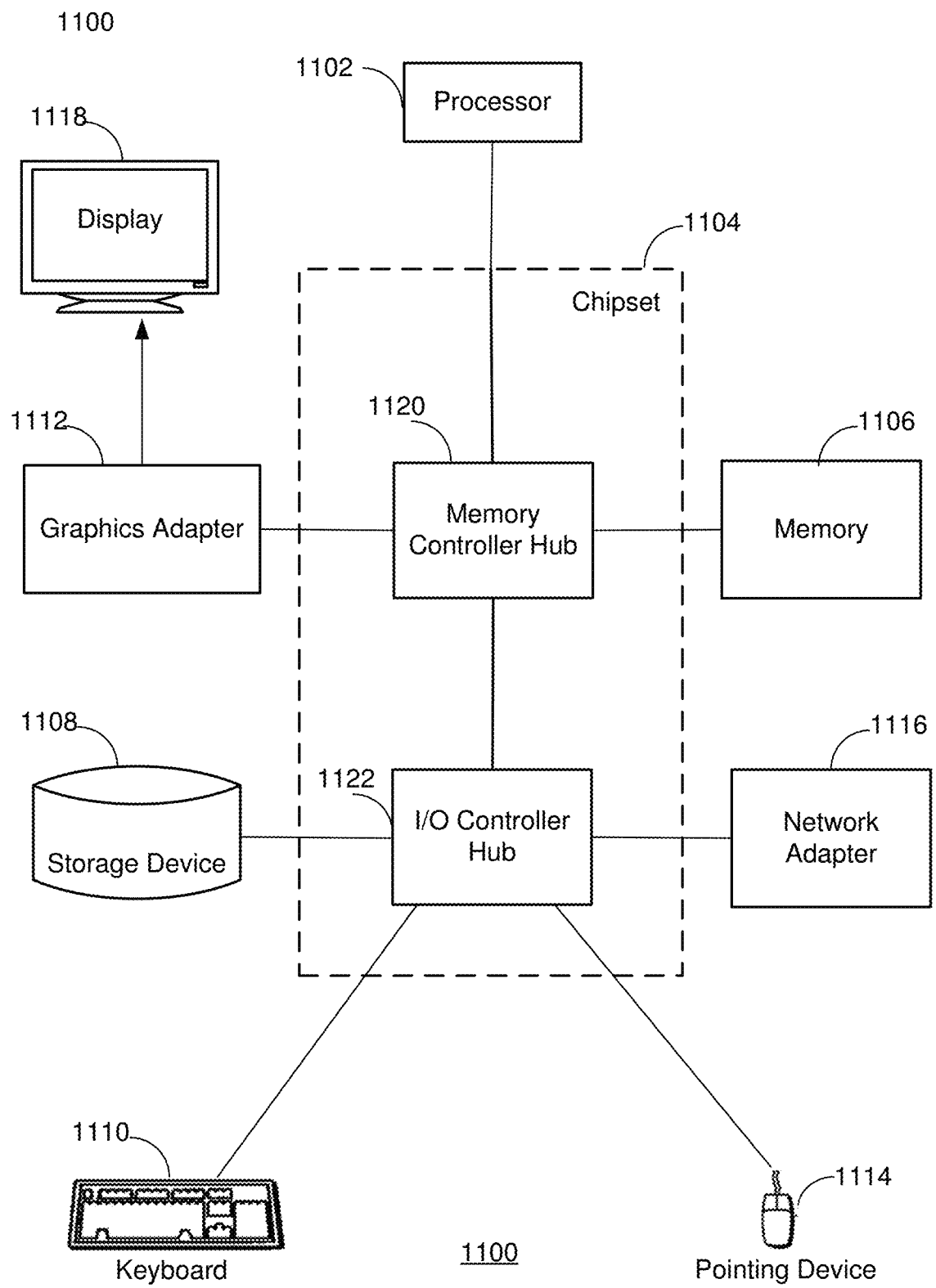
FIG. 11 is a block diagram illustrating a functional view of a typical computer system according to one embodiment.

FIG. 11 is a high-level block diagram illustrating a functional view of a typical computer system for use as one of the entities illustrated in the environment 100 of FIG. 1 according to an embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 1100. The graphics adapter 1112 displays images and other information on the display 1118. The network adapter 1116 couples the computer system 1100 to a network.

As is known in the art, a computer 1100 can have different and/or other components than those shown in FIG. 11. In addition, the computer 1100 can lack certain illustrated components. For example, a computer system 1100 acting as an online system 120 may lack a keyboard 1110 and a pointing device 1114. Moreover, the storage device 1108 can be local and/or remote from the computer 1100 (such as embodied within a storage area network (SAN)).

The computer 1100 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the entities of FIG. 1 can vary depending upon the embodiment and the processing power used by the entity. For example, a client device 115 may be a mobile phone with limited processing power, a small display 1118, and may lack a pointing device 1114. The online system 120, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method performed by a conversation engine configured to execute chatbots, the method comprising:
   receiving, from a first client device, by a conversation engine configured to execute a chatbot, a conversation engine configuration specifying a set of states in which the chatbot can exist and actions performed by the conversation engine in each state for executing the chatbot;
   receiving, from the first client device, by the conversation engine, a chatbot configuration specifying a plurality of tasks supported by the chatbot, each task performed in response to a user request received via the chatbot;
   initializing, by the conversation engine, a state of the chatbot;
   executing, by the conversation engine, the chatbot according to the chatbot configuration to perform one or more tasks by repeating steps comprising:
      receiving, from a second client device, a user utterance;
      performing actions based on the state of the chatbot and one or more attributes of the user utterance, the actions comprising one or more of: (1) identifying a task requested by the user, (2) collecting values of one or more entities for performing the task, and (3) performing the task based on the values of the entities;
      updating the state of the chatbot; and
      generating a response and sending to the user at the second client device.

2. The method of claim 1, wherein the state of the chatbot is represented using a set of state variables stored in a lookup table mapping for each state variable, an identifier of the state variable to a value of the state variable.

3. The method of claim 2, wherein a state variable represents whether the response generated by the conversation engine for the user is for confirming certain information with the user.

4. The method of claim 2, wherein the state variable represents whether the response generated by the conversation engine for the user is for confirming one of the following:
   (1) the task requested by the user,
   (2) a value of entity for performing the task, or
   (3) whether the user wants to continue the conversation with the conversation engine.

5. The method of claim 1, wherein the conversation engine configuration specifies whether the conversation engine confirms with the user after identifying the task corresponding to the user utterance.

6. The method of claim 1, wherein the conversation engine configuration specifies whether the conversation engine confirms with the user after determining a value of an entity for performing the task.

7. The method of claim 1, wherein the conversation engine configuration specifies a number of times the conversation engine repeats a response if the user utterance fails to provide an answer to the response.

8. The method of claim 1, wherein an attribute of the user utterance represents a polarity of the user utterance, wherein the polarity is one of:
   positive,
   negative, or
   neutral.

9. The method of claim 1, wherein an attribute of the user utterance represents whether the user utterance includes information expected by the conversation engine based on a previous response provided by the conversation engine to the user.

10. The method of claim 1, wherein the user utterance represents a request for performing a new task while one or more previous tasks have not completed execution by the conversation engine.

11. The method of claim 1, wherein the conversation engine stores data structure for representing a plurality of tasks that are currently executed by the conversation engine for the user based on conversation with the user.

12. The method of claim 11, wherein the conversation engine configuration determines an action performed by the conversation engine when a task is completed for the user and there are unfinished tasks stored in the data structure.

13. The method of claim 12, wherein the data structure is a last-in-first-out stack data structure.

14. The method of claim 1, wherein the user utterance is received as an audio signal of a natural language sentence spoken by the user, the method further comprising:
   converting the audio signal of the user utterance to a text signal for processing by the conversation engine.

15. The method of claim 1, further comprising:
   responsive to receiving the conversation engine configuration, generating a set of instructions for processing user requests based on chatbot conversations with users.

16. The method of claim 1, wherein the chatbot configuration specifies a set of example sentences for each task wherein identifying the task by the conversation engine comprises:
   matching the user utterance with example sentences specified in the chatbot configuration using a machine learning based model.

17. The method of claim 16, wherein the machine learning based model is a neural network.

18. The method of claim 1, wherein the conversation engine is a multi-tenant system hosting data and services for a plurality of tenants, wherein the chatbot configuration is specific to a tenant that performs a set of tasks using the multi-tenant system.

19. A computer system comprising:
a processor; and
a non-transitory computer readable storage medium storing instructions that when executed by the processor cause the processor to perform steps comprising:
- receiving, from a first client device, by a conversation engine configured to execute a chatbot, a conversation engine configuration specifying a set of states in which the chatbot can exist and actions performed by the conversation engine in each state for executing the chatbot;
- receiving, from a first client device, by the conversation engine, a chatbot configuration specifying a plurality of tasks supported by the chatbot, each task performed in response to a user request received via the chatbot;
- initializing, by the conversation engine, a state of the chatbot;
- executing, by the conversation engine, the chatbot according to the chatbot configuration to perform one or more tasks by repeating steps comprising:
  - receiving, from a second client device, a user utterance;
  - performing actions based on the state of the chatbot and one or more attributes of the user utterance, the actions comprising one or more of: (1) identifying a task requested by the user, (2) collecting values of one or more entities for performing the task, and (3) performing the task based on the values of the entities;
  - updating the state of the chatbot; and
  - generating a response and sending to the user at the second client device.

20. A non-transitory computer readable storage medium storing instructions that when executed by a processor cause the processor to perform steps comprising:
- receiving, by a conversation engine configured to execute a chatbot, a conversation engine configuration specifying a set of states in which the chatbot can exist and actions performed by the conversation engine in each state for executing the chatbot;
- receiving, from a first client device, by the conversation engine, a chatbot configuration specifying a plurality of tasks supported by the chatbot, each task performed in response to a user request received via the chatbot;
- initializing, from a first client device, by the conversation engine, a state of the chatbot;
- executing, by the conversation engine, the chatbot according to the chatbot configuration to perform one or more tasks by repeating steps comprising:
  - receiving, from a second client device, a user utterance;
  - performing actions based on the state of the chatbot and one or more attributes of the user utterance, the actions comprising one or more of: (1) identifying a task requested by the user, (2) collecting values of one or more entities for performing the task, and (3) performing the task based on the values of the entities;
  - updating the state of the chatbot; and
  - generating a response and sending to the user at the second client device.

* * * * *